United States Patent
Kuwahara

(10) Patent No.: US 11,924,672 B2
(45) Date of Patent: Mar. 5, 2024

(54) COMMUNICATION SYSTEM, COMMUNICATION CONTROL METHOD, AND STORAGE MEDIUM

(71) Applicant: Hitachi, Ltd., Tokyo (JP)

(72) Inventor: Mikio Kuwahara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 80 days.

(21) Appl. No.: 17/475,537

(22) Filed: Sep. 15, 2021

(65) Prior Publication Data

US 2022/0312255 A1 Sep. 29, 2022

(30) Foreign Application Priority Data

Mar. 23, 2021 (JP) .................................. 2021-048477

(51) Int. Cl.
| | |
|---|---|
| H04L 12/00 | (2006.01) |
| H04L 67/56 | (2022.01) |
| H04W 24/08 | (2009.01) |
| H04W 28/02 | (2009.01) |
| H04W 64/00 | (2009.01) |

(52) U.S. Cl.
CPC ......... *H04W 28/0268* (2013.01); *H04L 67/56* (2022.05); *H04W 24/08* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 2018/0324889 A1 | 11/2018 | Babaei et al. | |
| 2020/0146032 A1 | 5/2020 | Bae et al. | |
| 2020/0204477 A1* | 6/2020 | Rahman | ................. H04L 69/22 |
| 2020/0252813 A1* | 8/2020 | Li | ........................ G06Q 20/382 |
| 2021/0037400 A1* | 2/2021 | Yao | ........................ H04W 24/02 |
| 2021/0289376 A1* | 9/2021 | Chou | ..................... H04W 24/08 |
| 2021/0314906 A1* | 10/2021 | Matolia | ............... H04W 64/006 |

FOREIGN PATENT DOCUMENTS

| | | |
|---|---|---|
| JP | 2018-056867 A | 4/2018 |
| JP | 2020-504519 A | 2/2020 |
| JP | 2020-520589 A | 7/2020 |
| JP | 2020-530703 A | 10/2020 |

* cited by examiner

*Primary Examiner* — Noel R Beharry
*Assistant Examiner* — Lionel Preval
(74) *Attorney, Agent, or Firm* — Mattingly & Malur, PC

(57) ABSTRACT

It is provided a communication system comprising: at least one IoT terminal; a base station apparatus to which the IoT terminal is to be coupled; an edge server selectively receives user plane packets transmitted and received by the base station apparatus; and a cloud server selectively receives user plane packets transmitted and received by one of the base station apparatus and the edge server, wherein at least one of the IoT terminal, the edge server, or the cloud server has arranged therein a first middleware formed of software, and wherein the first middleware receives an instruction on a policy which is set based on a result of analyzing traffic of packets transported in the communication system; receives by proxy an instruction to transmit packets from an application; adjusts timings to transmit the packets in accordance with the instructed policy; and relays a transmission instruction to a communication module.

7 Claims, 17 Drawing Sheets

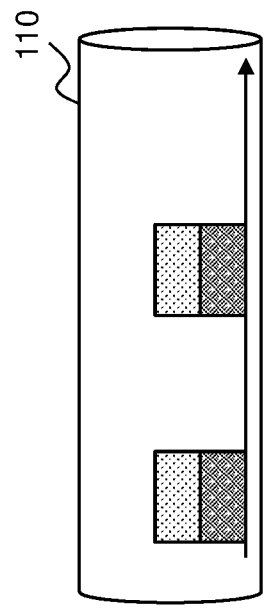
Fig. 5
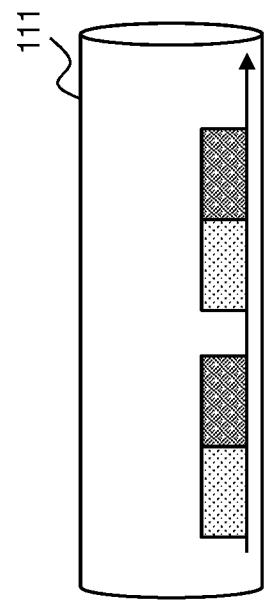
Fig. 6
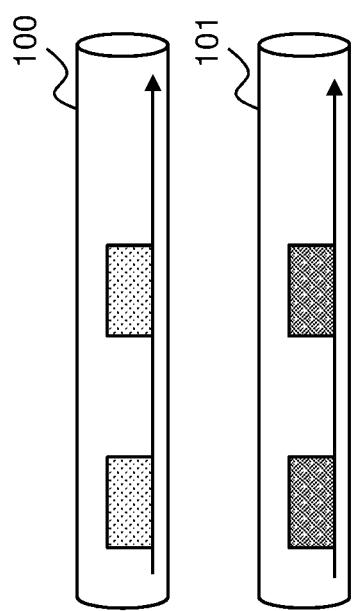
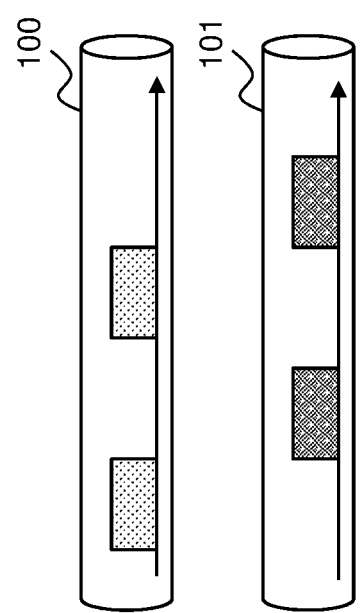

USE CASE #02

COMMUNICATION SYSTEM, COMMUNICATION CONTROL METHOD, AND STORAGE MEDIUM

CLAIM OF PRIORITY

The present application claims priority from Japanese patent application JP 2021-48477 filed on Mar. 23, 2021, the content of which is hereby incorporated by reference into this application.

BACKGROUND OF THE INVENTION

This invention relates to a communication control method which is executed in a communication system.

An IoT system, that is, the Internet coupling of things, is expected to undergo further development in the future. In the IoT system, things, for example, sensors, serve as information emission sources, and it is predicted that machine-to-machine communication (M2M) increases rapidly. Such information transmitted from things is generated from various positions in a space. For example, in a large-scale factory or plant, things are arranged on a vast site in a dispersed manner, and a large amount of information is collected from those things.

In such collection of information from a wide area, a form in which radio communication is used is effective in reducing a network construction cost. In the radio communication, the 5G system is developed by 3GPP, which is a standardization organization, and a communication infrastructure environment with low delay and a large capacity is being established.

In the 5G, a plurality of applications can use one physically integrated wireless network by developing virtual network slices (NW slices) in accordance with service level agreements (SLAB) respectively set for the applications to divide and use the integrated physical network.

Further, with the development of device technologies, an inexpensive device can also have a form in which a graphic processing unit (GPU) is mounted, and with the low-delay and large-capacity communication using 5G, large-capacity content information, for example, video, can be provided to an edge server closer to a site, and real-time processing can also be performed by using machine learning accompanying high-level determination.

Therefore, in addition to the cloud that has hitherto been used, multi-location calculation processing in which computation processing is performed in a device or an edge server at a location closer to the site is enabled, and a form of an application is also being changed. In the multi-location calculation environment, an application is not formed as one monolithic software package, but has started to transition to a microservice application, which is a form completed by generating a portion having broad utility as a common module that can be used for various purposes, and newly generating a characteristic portion unique to each application, and which can adapt to frequent updates depending on statuses.

The related-art configuration formed of terminals and a cloud server has a form in which an application is installed on the cloud server, and all information from the terminals is collected in the cloud server and processed in the cloud server. In a new multi-location calculation environment, the application is divided into modules and arranged in the terminals, the edge server, and the cloud server in an appropriate manner, and it is considered that processing that requires higher responsiveness is processed in real time at a location close to a site (terminals) through high-speed and low-delay communication, for example, 5G.

Then, the modules forming the application are delivered and deployed from a repository provided in a center (or cloud). In contrast to the cloud server, a computer resource of the edge server, and communication between the terminals and the edge server are achieved by using limited network resources, or by being divided by a technology, for example, the NW slices, and hence, at the time of deployment, it is important to set the network in consideration of not only a feature of the application, but also environment setting parameters of how to use the network and how the functions are arranged in a distributed manner. Further, in a case of mobile units, support depending on a destination of movement is also required. However, the application per se should be designed by being rapidly arranged and eliminating environment dependency, and it is required to provide an intermediate layer for grasping a network state and providing a method of using the network expected by the application.

In forming the NW slices, it is important to take countermeasures against a case in which the limited network resources are depleted. In JP 2018-056867 A, there is disclosed a technology of carrying out communication in a configuration of a plurality of NW slices by assigning priorities depending on quality of service (QoS) of each slice.

In order to sum up problems in the related art, two use cases are considered specifically.

In the first use case, an automated guided vehicle (AGV) used in a factory, a distribution warehouse, or the like is considered. The AGV is coupled to a management system through use of radio communication, and is managed by the management system. Operation of the AGV is broadly classified into four phases: the first phase of retrieving items from a warehouse, the second phase of conveying the retrieved items, the third phase of passing the retrieved materials to an operator requiring the materials, and the fourth phase of returning to the warehouse. Different processes are performed in the respective phases. Contents of communication and required quality of service change for each phase, and hence priorities should be changed depending on the phase also from the view of the entire network.

In the second use case, software on a production line in a factory is updated. The software may be installed in semi-finished goods moving along the line, and the software may be updated depending on a test required in each step, for example. Even when a wireless communication area is designed to cover the entire line of the factory, the update of the software should be performed in a particular step (that is, location) on the line. Otherwise, a mismatch occurs in an environment or test content in a subsequent step, and a process in the subsequent step becomes difficult.

As in the two cases, priorities of communication depend on the step or the location. Therefore, it is insufficient just to develop virtual NW slices simply in accordance with the SLA set for the application, and divide and use the integrated physical network as in the related art, and it is required to appropriately manage the network in conjunction with the application status and environments, for example, the location. As for the application, as already described, the function to be achieved by the application and the management of the network should be separated from each other while making use of common portions. An arrangement for mediating between the network and the application is required between the application and the network management. In this context, assignment of priorities depending only on predetermined quality of service of the respective slices as disclosed in JP 2018-056867 A is insufficient in those use cases.

Next, network usage assuming IoT is examined. Countermeasures against a case in which intermittent and semi-periodic traffic flows are also important. In JP 2020-520589 A, there is disclosed a technology for performing semipersistent scheduling in a wireless network.

In order to sum up problems in the related art, still another specific use case is examined.

In the third use case, on a production line in a factory, information is collected from sensors arranged in respective steps to collect quality information of semifinished goods moving through manufacturing steps. Inspections are provided in multiple stages in the respective steps. Numeric data is transmitted intermittently from the sensors to the center as goods move at fixed intervals on the line. However, when the number of sensors becomes enormous, a large amount of inspection data is collected. As a result, burst traffic is generated, and temporary concentration of processing is generated in the network and on the receiver side to become a factor that leads to temporary depletion of network or calculation resources. In order to manage such periodic traffic, it has been considered effective to assign slots in advance in an attempt to suppress occurrence of temporary overlaps (or collisions) of communication.

However, the management of the burst traffic requires a mechanism in which the traffic is analyzed via an analysis function of grasping concentration of traffic, and concentration of traffic is automatically avoided based on a result of the analysis. However, in the related art, predetermined slots are merely provided on the network side, and intermittent operations that are considered to change depending on various factors such as arrangement of sensors or a period of the line cannot be supported, which is insufficient support. In addition, in other related-art technologies, it is described to include means for analyzing network. However, in such use cases, there is no related-art technology in which transmission timings are arbitrated, and support is considered to be insufficient.

As use cases of a similar traffic arbitration function using analysis, two examples are further considered.

In the fourth use case, traffic congestion is grasped, and a large amount of data is transmitted at an off-peak time. In the fourth use case, an application completes transmission processing by a writing request to a middleware for arbitrating the transmission. The middleware grasps a network status to estimate the off-peak time of the traffic, and transmits the data at the off-peak time.

The fifth use case is similarly a case in which a radio wave status of a terminal is grasped to transmit a large amount of data targeting a time when the radio wave status is good. In the fifth use case, an application completes transmission processing by a writing request to a middleware for arbitrating the transmission. The middleware grasps the radio wave status of the terminal to estimate a radio wave state of the terminal, and transmits the data at appropriate timings.

As in the two cases, network use efficiency can be increased in non-urgent communication by the analysis function. However, the application should be separated from the management of the network or the management of the radio wave status of the terminal, for example, and as described in the use cases, an arrangement for mediating between the network and the application is required between the application and the network management. In this context, the analysis function as disclosed in JP 2020-530703 A alone is insufficient in those use cases.

In JP 2020-504519 A, there is a disclosure of a mechanism with which uplink transmission can be performed without a grant for transmission, but even with this method, the use cases that have been introduced cannot be resolved.

FIG. 1 is a diagram for illustrating a configuration of a 5G network system according to a related-art example, and a configuration of the network system formed of a 5G network, terminals, an edge server, and a cloud server, and network slices are illustrated.

In FIG. 1, terminals 1-1 and 1-2 are coupled to a base station apparatus 10 via radio. Further, the base station apparatus 10 is coupled to a user plane function (UPF) 20. Through the UPF 20, control plane signals for transporting control signals for monitoring the coupling to the terminals and controlling movement, for example, handover, and user plane signals for transporting user data flow. The UPF 20 has roles of routing the user plane signals based on a predetermined rule, and selecting and sorting signals to be transferred to an edge server 30. With this function, particular communications can be sorted to the edge server 30 to be processed in the edge server 30.

In the lower part of FIG. 1, a network slice 100 formed by the function of the UPF 20 is drawn in an image of a clay pipe (horizontal cylinder). Packets sorted in the UPF 20 arrive at the edge server 30, and processing is performed by a software module in the edge server 30 so that an operation as a part of an application is performed. Further, another network slice 101 including the terminals 1-1 and 1-2 can be similarly formed, and a virtual environment in which an application different from the above-mentioned application runs can be provided.

Results of the processing in the edge server 30 can be fed back to the terminals 1-1 and 1-2 through the network slice 101. In that case, packets routed back at the edge server 30 is returned to the base station apparatus 10 via the UPF 20, and the feedback is transported to each of the terminals 1-1 and 1-2. Information sent to a center side is input to a UPF 21 on the center side by the UPF 20, and is divided into a control plane and a user plane to be transported to destination apparatus in the respective planes. In other words, the control plane signals are transported to a 5G core apparatus 50, and the user plane signals are transported to a cloud server 40.

In the cloud server 40, another software module forming a part of the application runs, and processing related to user data is executed based on the transported information. Further, the control plane signals are used for network management in the 5G core apparatus 50. The 5G core apparatus is formed of an aggregate of a plurality of functions. An application function (AF), a network exposure function (NEF), a policy control function (PCF), an access and mobility management function (AMF), and a session management function (SMF) of FIG. 1, for example, represent some of the functions.

Further, in the lower part of FIG. 1, a network slice 102 including the terminals 1-1 and 1-2 is drawn, and the network slice 102 includes the terminals 1-1 and 1-2 as well as a network up to the cloud server 40.

FIG. 2 is a diagram for illustrating a configuration of a repository that deploys an application in terminals, an edge server, and a cloud server in a network system according to a related-art example.

The arrows extending in broken lines from the repository, which is a newly added component with respect to FIG. 1, represent deployment of modules, each of which forms a part of the application, to be arranged in terminals 1-1 and 1-2, the edge server 30, and the cloud server 40. A repository 60 is a warehouse storing software of the modules forming the application. When the modules are to be deployed in the cloud server 40 alone, there are enough resources for forming a network in the cloud server 40, and hence it is not required to worry about the management of the resources. However, when the modules are to be deployed in the edge server 30 and the terminals 1-1 and 1-2 as well, consideration is given to the fact that resources of 5G radio communication coupling the terminals 1-1 and 1-2 and the edge server 30 and a wired network coupling the UPF 20 at the site and the UPF 21 at the center are limited, and the resources may be short depending on the environment or the status in which another application uses. Therefore, more appropriate management is required.

FIG. 3 is a signaling sequence chart in which, in the related-art technology, the application is deployed from the repository 60 to a terminal 1 and the edge server 30, and then a network configuration is set.

In downloading of messages and software for deployment (1000), messages and a software main body for instructing each node on the deployment are transported from the repository 60. For example, the terminal 1 deploys a terminal application (2000-2), and the edge server 30 deploys an edge server application (2000-1). Then, the edge server 30 carries out a network configuration process (2001), analyzes network requirements required by the application, and transmits a request message to the 5G core apparatus 50 (1001). A result thereof is transmitted as setting messages to the UPFs 20 and 21 via the SMF (1002 and 1003). Setting messages are also transmitted to the base station apparatus 10 and the terminal 1 via the AMF (1004 and 1005). Thereafter, a response message is returned from the 5G core apparatus 50 to the edge server 30 (1006) to complete the network configuration settings.

Through the above-mentioned sequence, the network slices are formed between the terminal and the edge server to establish communication 1500.

SUMMARY OF THE INVENTION

In a case in which, under an environment in which a large number of sensors and devices are spatially arranged, and a plurality of applications run for respective purposes, the plurality of applications use one physically integrated wireless network, for example, 5G, by dividing and using the network into virtual NW slices in accordance with SLAs respectively set for the applications, it is desired that the applications transport data eliminating the dependency on the environment, for example, the network. Meanwhile, depending on the application, when the transportation is performed based on statuses such as positions of devices, traffic of the entire network, or radio wave statuses of the devices, efficient operation in terms of network use can be achieved. However, it is difficult to manage network statuses by each application because it is required to increase the development speed of applications.

In the related art, there is disclosed a method involving assigning priorities associated with NW slices in advance, or assigning slots for intermittent transmission in advance. However, it is difficult to manage temporary surplus of resources that cannot be used up in the NW slices and arbitrate among the slices. Therefore, resources can only be used under the constraint of SLAs of the slices. It is difficult to effectively use wasted resources that are not used for a limited computer resource of the edge server 30 and limited network resources coupling the terminal 1 and the edge server 30.

The representative one of inventions disclosed in this application is outlined as follows. There is provided a communication system, comprising: at least one IoT terminal; a base station apparatus to which the at least one IoT terminal is to be coupled; an edge server configured to selectively receive user plane packets transmitted and received by the base station apparatus; and a cloud server configured to selectively receive user plane packets transmitted and received by one of the base station apparatus and the edge server, wherein at least one of the at least one IoT terminal, the edge server, or the cloud server has arranged therein a first middleware formed of software, and wherein the first middleware is configured to: receive an instruction on a policy which is set based on a result of analyzing traffic of packets transported in the communication system; receive by proxy an instruction to transmit packets from an application; adjust timings to transmit the packets in accordance with the instructed policy; and relay a transmission instruction to a communication module.

According to at least one aspect of this invention, the NW slices can be provided efficiently. Problems, configurations, and effects other than those described above will become apparent by the following description of embodiments.

BRIEF DESCRIPTION OF THE DRAWINGS

FIG. 5 is a schematic diagram for illustrating a packet flowing through network slices according to a related-art example.

FIG. 6 is a schematic diagram for illustrating a packet flowing through network slices according to the first embodiment.

DETAILED DESCRIPTION OF THE PREFERRED EMBODIMENTS

First Embodiment

A first embodiment of this invention is described.

Figure 1:
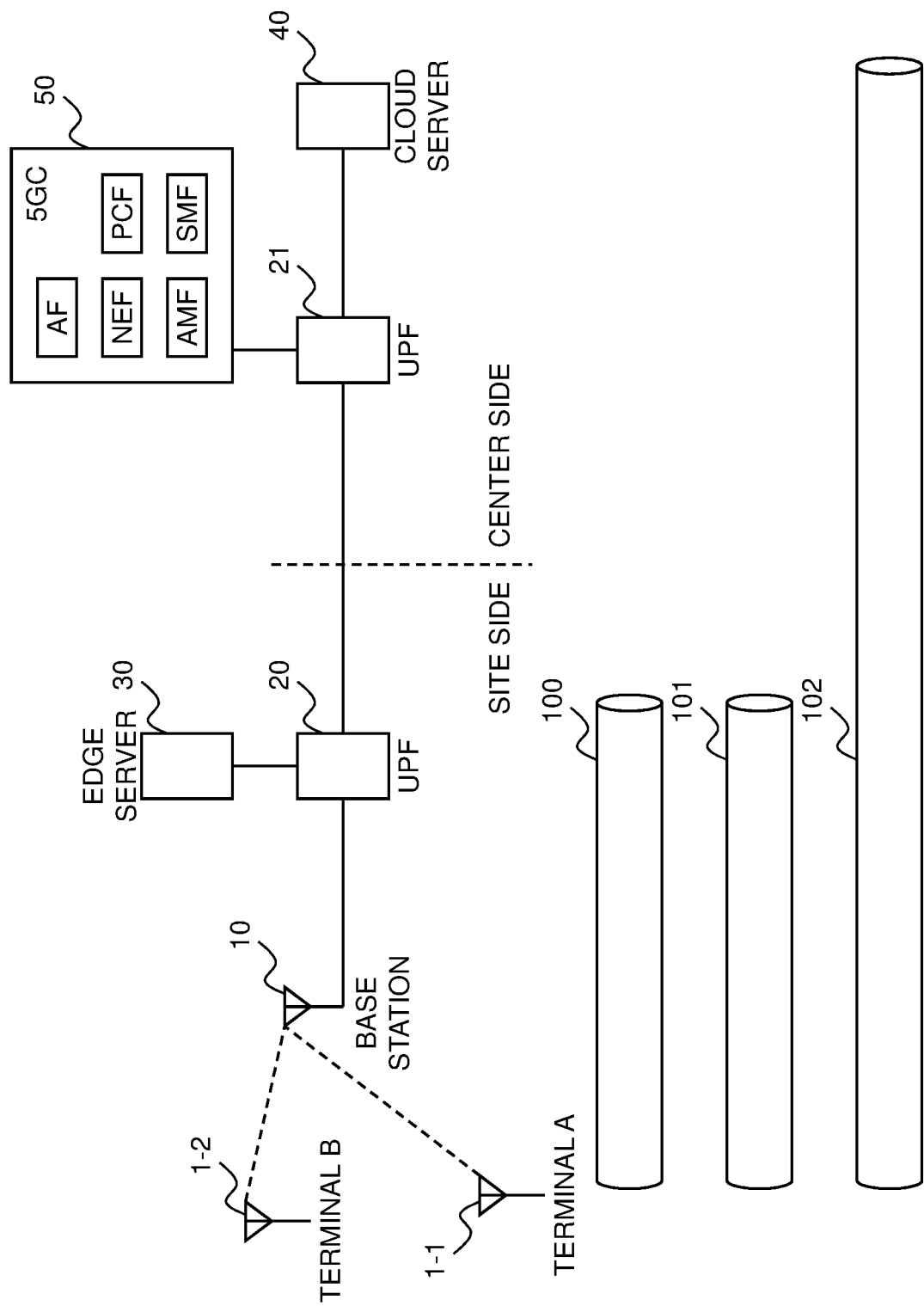
FIG. 1 is a diagram for illustrating a configuration of a 5G network system according to a related-art example.
Figure 2:
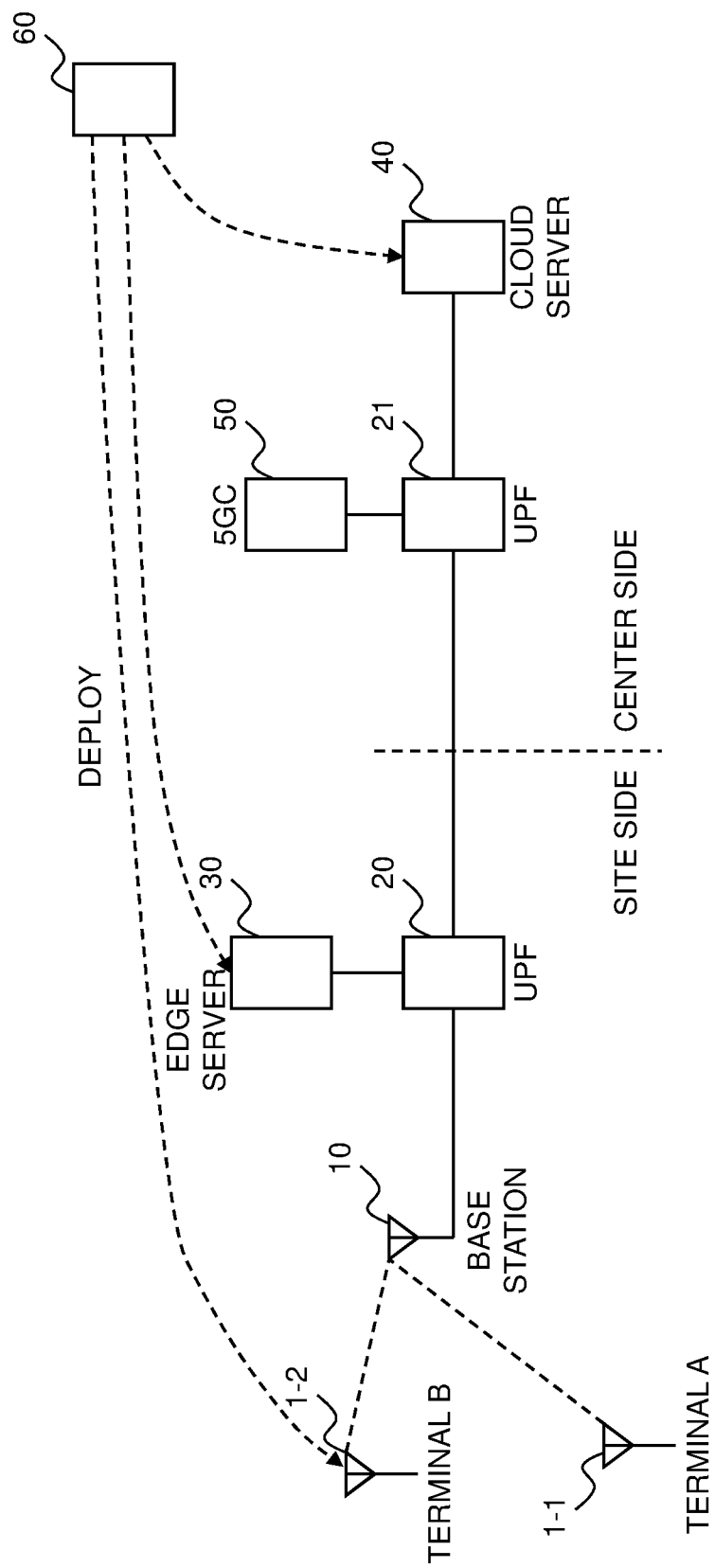
FIG. 2 is a diagram for illustrating a configuration of a deployment from a repository according to a related-art example.
Figure 3:
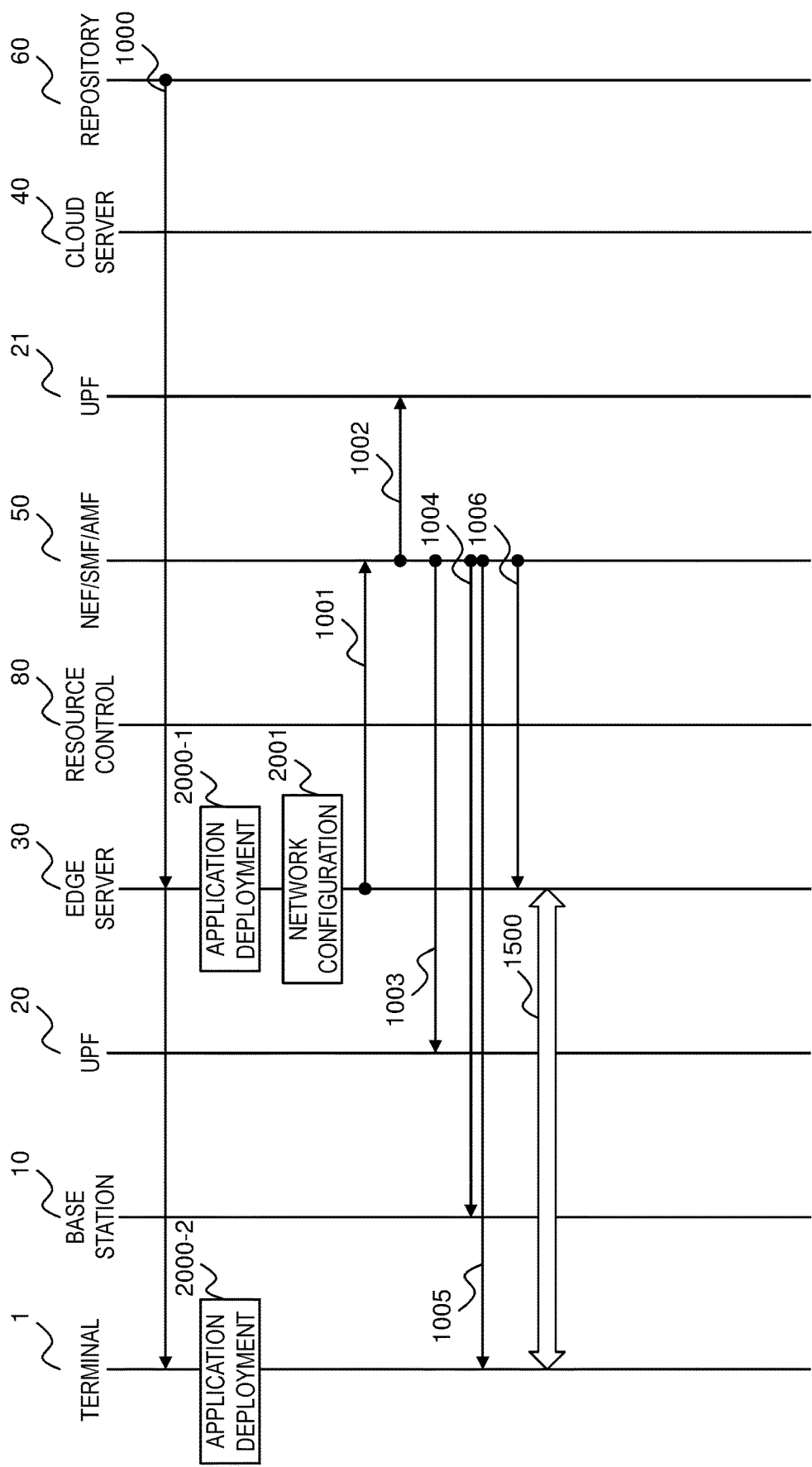
FIG. 3 is a sequence chart for illustrating signaling in which a network configuration is set after application is deployed according to a related-art example.
Figure 4:
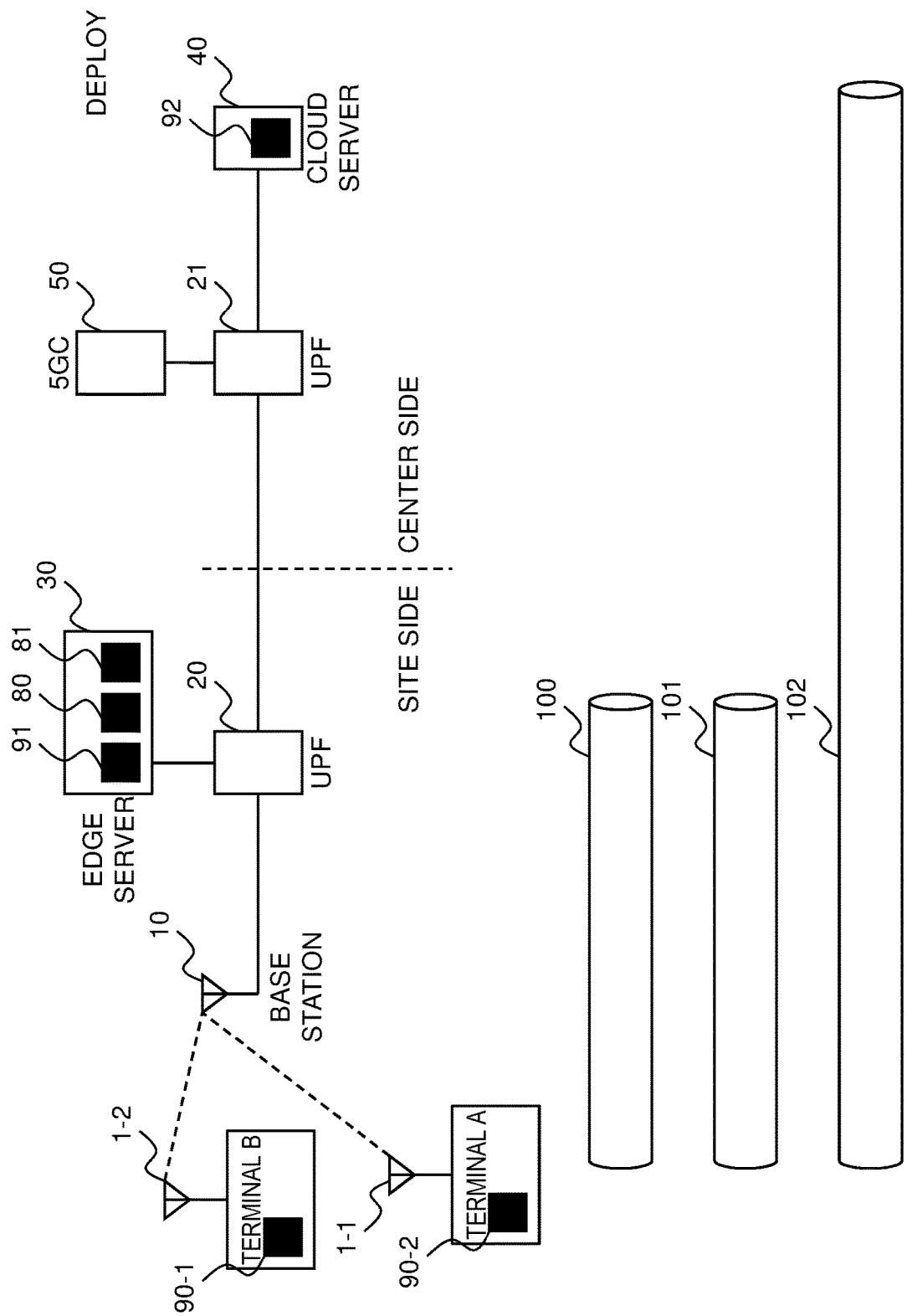
FIG. 4 is a diagram for illustrating a configuration of a network system according to a first embodiment.

FIG. 4 is a diagram for illustrating a configuration of a network system according to the first embodiment of this invention, and a configuration of the network system including a 5G network, terminals, an edge server, and a cloud server, and images of network slices are illustrated.

In FIG. 4, terminals 1-1 and 1-2 are coupled to a base station apparatus 10 via radio. Further, the base station apparatus 10 is coupled to a user plane function (UPF) 20. Through the UPF 20, control plane signals for transporting control signals for monitoring the coupling to the terminals and controlling movement, for example, handover, and user plane signals for transporting user data flow. The UPF 20 has roles of routing the user plane signals based on a predetermined rule, and selecting and sorting signals to be transferred to an edge server 30. With this function, particular communications can be sorted to the edge server 30 to be processed in the edge server 30.

In the lower part of FIG. 4, a network slice 100 formed by the function of the UPF 20 is drawn in an image of a clay pipe (horizontal cylinder). Packets selectively sorted in the UPF 20 arrive at the edge server 30, and processing is performed by a software module in the edge server 30 so that an operation as a part of the application is performed. Further, another network slice 101 including the terminals 1-1 and 1-2 can be similarly formed, and a virtual environment in which an application different from the above-mentioned application runs can be provided.

Results of the processing in the edge server 30 can be fed back to the terminals 1-1 and 1-2 through the network slice 101. In that case, packets routed back at the edge server 30 is returned to the base station apparatus 10 via the UPF 20, and the feedback is transported to each of the terminals 1-1 and 1-2. Information sent to a center side is input to a UPF 21 on the center side by the UPF 20, and is divided into a control plane and a user plane to be transported to destination apparatus in the respective planes. In other words, the control plane signals are transported to a 5G core apparatus 50, and the user plane signals are transported to a cloud server 40.

In the cloud server 40, another software module forming a part of the application runs, and processing related to user data is executed based on the transported information. Further, the control plane signals are used for network management in the 5G core apparatus 50. The 5G core apparatus 50 is formed of an aggregate of a plurality of functions.

Further, in the lower part of FIG. 4, a network slice 102 including the terminals 1-1 and 1-2 is drawn, and the network slice 102 includes the terminals 1-1 and 1-2 as well as a network up to the cloud server 40.

Referring to FIG. 5, description is given in a schematic manner of an example in which comprehensive management of packets flowing through a plurality of slices is effective. In FIG. 5, how packets flow through two network slices 100 and 101 is depicted. The network slices are virtual, and hence, in an actual physical network 110, the packets flowing through the two network slices 100 and 101 flow in a superimposed manner. As can be seen from FIG. 5, when it is assumed that the respective network slices are independent, packets flowing at the same time overlap on a time axis. Especially in an IoT use case that is based on M2M in which reports are made in synchronization in time, a burst occurs due to an incident in which packets flow from a plurality of sensors simultaneously at a predetermined time (for example, 00:00).

In FIG. 6, how a transmission timing of the network slice 101 is shifted is depicted. In the case illustrated in FIG. 6, packets flowing through two network slices 100 and 101 are superimposed, but are shifted in time, and hence no burst occurs in an actual physical network 111. In this manner, in order to ensure a band defined in SLAs of the respective network slices in the first place, overall control across a plurality of network slices is required. Control of the entire network is performed in a network layer, and a method of assigning priorities among different network slices based on QoS is disclosed in JP 2018-056867 A.

However, in a case in which timings are managed in a network, in a protocol in which a response is expected as in TCP/IP, for example, when a delay in response occurs due to timing adjustment, another effect of a limited band occurs, for example. Therefore, operation at a layer closer to the application is desired. Meanwhile, an application for managing a network is complicated, and affects development of the application, and hence a mechanism of managing the network in an intermediate layer therebetween is desired.

A middleware for controlling transmission timings can be arranged at various positions. In FIG. 4, middlewares 90-1 and 90-2 arranged in the terminals 1, a middleware 91 arranged in the edge server 30, and a middleware 92 arranged in the cloud server 40 are shown. The UPF 20 on a site side, through which all packets pass, mirrors the packets and delivers the mirrored packets to the edge server 30. Another middleware 81 of the edge server 30 captures and analyzes the packets mirrored by the UPF 20, and provides a result of the analysis to a resource control function 80. The resource control function 80 for arbitrating the transmission timings in conjunction with the result, and with the middlewares 90, 91, and 92 for controlling the transmission timings, is implemented as a middleware. Specifically, the resource control function 80 generates a control policy on the timings to transmit the packets in accordance with a policy which is set by a user based on the result of analysis by the packet analysis middleware 81, and instructs the transmission timing control middlewares 90, 91, and 92 on the generated control policy. The transmission timing control middlewares 90, 91, and 92 receive by proxy instructions to transmit packets from applications of the respective apparatus (terminal 1, edge server 30, and cloud server 40), adjust timings to transmit the packets in accordance with the policy instructed by the resource control function 80, and relay a transmission instruction to a communication module.

Figure 7:
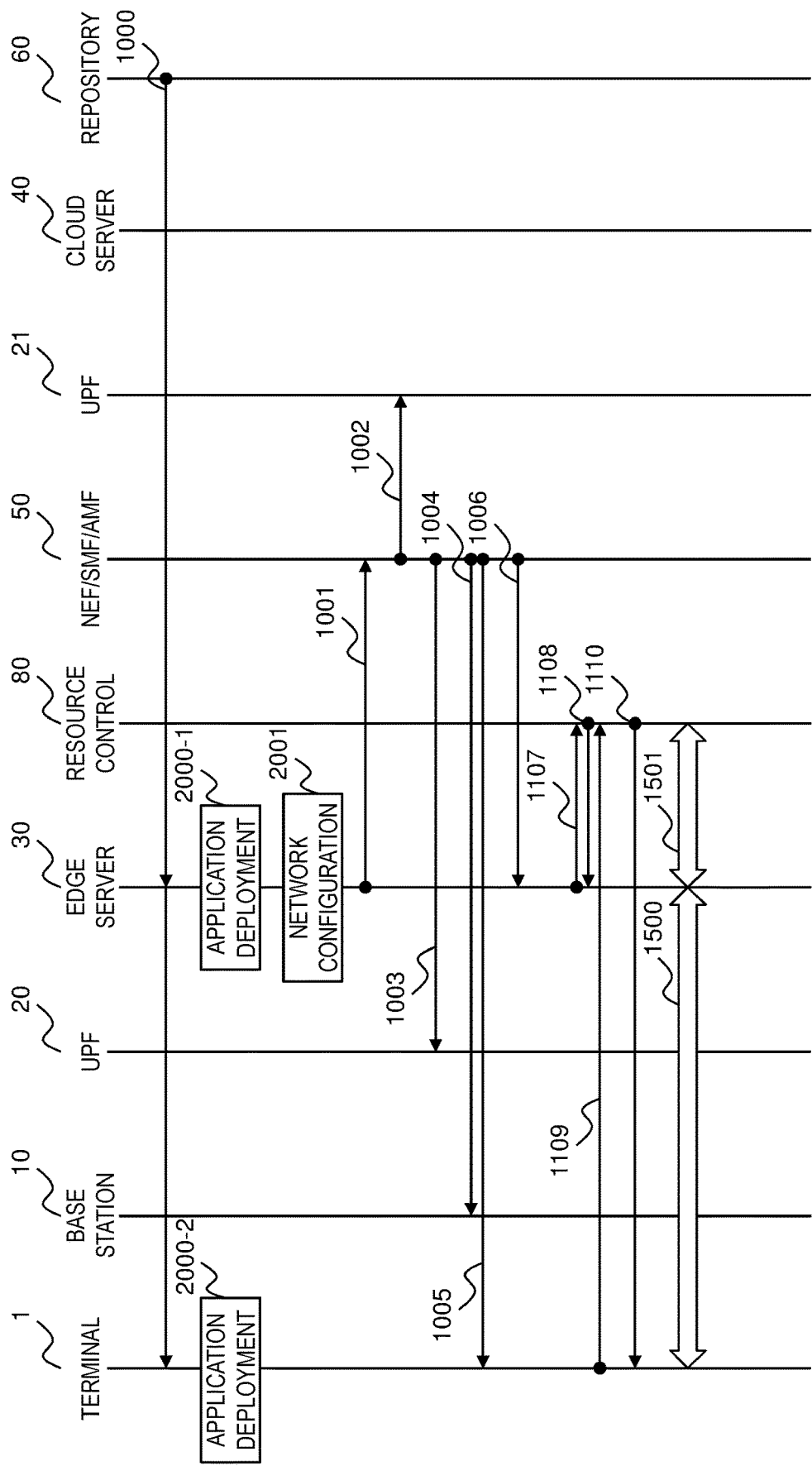
FIG. 7 to FIG. 9 are sequence charts each for illustrating signaling in which a network configuration is set after application is deployed according to the first embodiment.

FIG. 7 is a signaling sequence chart in which the application is deployed from a repository 60 to the terminal 1 and the edge server 30, and then a network configuration is set. An example of the first embodiment illustrated in FIG. 7 has a feature that the transmission control middleware 90 included in the terminal 1 exchanges messages with the resource control function 80 to perform transmission control.

In downloading of messages and software for deployment (1000), messages and a software main body for instructing each node on the deployment are transported from the repository 60. For example, the terminal 1 deploys a terminal application (2000-2), and the edge server 30 deploys an edge server application (2000-1). Then, the edge server 30 carries out a network configuration process (2001), analyzes network requirements required by the application, and transmits a request message to the 5G core apparatus 50 (1001). A result thereof is transmitted as setting messages to the UPFs 20 and 21 via an SMF (1002 and 1003). Setting messages are also transmitted to the base station apparatus 10 and the terminal 1 via an AMF (1004 and 1005). Thereafter, a response message is returned from the 5G core apparatus 50 to the edge server 30 (1006) to complete the network configuration settings.

Then, the edge server 30 transmits, through a message including information on the deployed application and coupling information of the terminal, an instruction to adjust the transmission timings to the resource control function 80 (1107). The resource control function 80 replies with a response message to the instruction (1108). The response message includes a telemetry request to the analysis middleware 81. The analysis middleware 81 mounted in the edge server starts a task of analyzing packets flowing through the slice. During communication, the terminal 1 transmits a message including information on the communication to the resource control function 80 (1109). The resource control function 80 transmits a message including information on scheduling to the terminal 1 (1110).

Through the above-mentioned sequence, the network slices are formed between the terminal and the edge server to establish communication 1500. In the communication 1500, the terminal 1 transmits packets based on a rule on scheduling delivered from the resource control function 80. Further, an analysis of the communication 1500 is made in the analysis middleware 81, and a telemetry 1501 as a result of the analysis is provided to the resource control function 80. The resource control function 80 uses information of the telemetry to transmit a message including information on scheduling to the terminal 1 and update the scheduling as required (1110).

Figure 8:
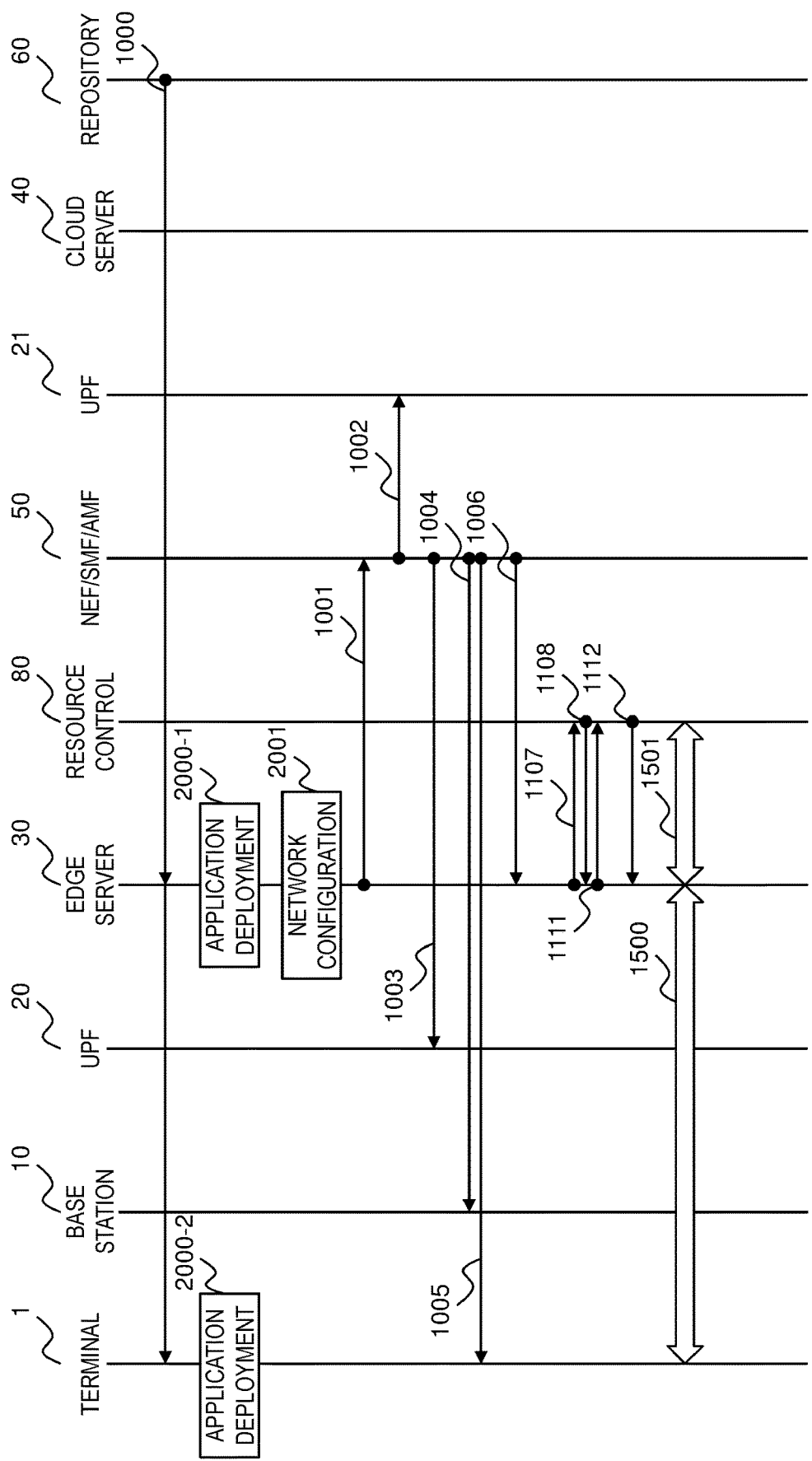

FIG. 8 is a signaling sequence chart in which the application is deployed from the repository 60 to the terminal 1 and the edge server 30, and then a network configuration is set. An example of the first embodiment illustrated in FIG. 8 has a feature that the transmission control middleware 91 included in the edge server 30 exchanges messages with the resource control function 80 to perform transmission control.

In downloading of messages and software for deployment (1000), messages and a software main body for instructing each node on the deployment are transported from the repository 60. For example, the terminal 1 deploys a terminal application (2000-2), and the edge server 30 deploys an edge server application (2000-1). Then, the edge server 30 carries out a network configuration process (2001), analyzes network requirements required by the application, and transmits a request message to the 5G core apparatus 50 (1001). A result thereof is transmitted as setting messages to the UPFs 20 and 21 via the SMF (1002 and 1003). Setting messages are also transmitted to the base station apparatus 10 and the terminal 1 via the AMF (1004 and 1005). Thereafter, a response message is returned from the 5G core apparatus 50 to the edge server 30 (1006) to complete the network configuration settings.

Then, the edge server 30 transmits, through a message including information on the deployed application and coupling information of the terminal, an instruction to adjust the transmission timings to the resource control function 80 (1107). This message includes a telemetry request to the analysis middleware 81. In response to this message, the analysis middleware 81 mounted in the edge server starts a task of analyzing packets flowing through the slice. The resource control function 80 replies with a response message (1108).

During communication, the edge server 30 transmits a message including information on the communication to the resource control function 80 (1111). The resource control function 80 transmits a message including information on scheduling to the edge server 30 (1112).

Through the above-mentioned sequence, the network slices are formed between the terminal and the edge server to establish the communication 1500. In the communication 1500, the edge server 30 transmits packets based on a rule on scheduling delivered from the resource control function 80. Further, the analysis of the communication 1500 is made in the analysis middleware 81, and the telemetry 1501 as a result of the analysis is provided to the resource control function 80. The resource control function 80 uses information of the telemetry to transmit a message including information on scheduling to the edge server 30 and update the scheduling as required (1112).

Figure 9:
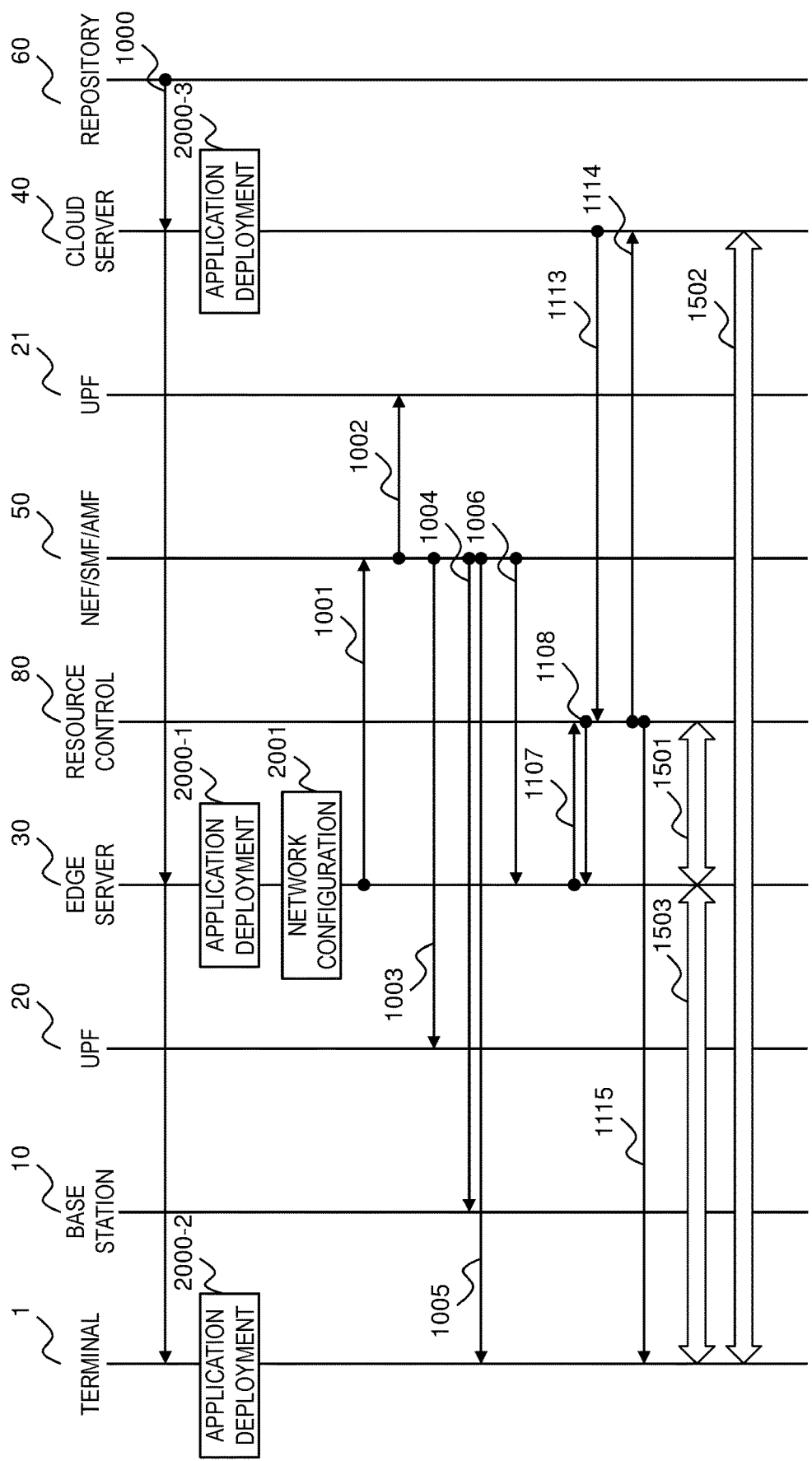

FIG. 9 is a signaling sequence chart in which the application is deployed from the repository 60 to the terminal 1, the edge server 30, and the cloud server 40, and then a network configuration is set. An example of the first embodiment illustrated in FIG. 9 has a feature that the transmission control middleware 92 included in the cloud server 40 exchanges messages with the resource control function 80 to perform transmission control.

In downloading of messages and software for deployment (1000), messages and a software main body for instructing each node on the deployment are transported from the repository 60. For example, the terminal 1 deploys a terminal application (2000-2), and the edge server 30 deploys an edge server application (2000-1). Then, the edge server 30 carries out a network configuration process (2001), analyzes network requirements required by the application, and transmits a request message to the 5G core apparatus 50 (1001). A result thereof is transmitted as setting messages to the UPFs 20 and 21 via the SMF (1002 and 1003). Setting messages are also transmitted to the base station apparatus 10 and the terminal 1 via the AMF (1004 and 1005). Thereafter, a response message is returned from the 5G core apparatus 50 to the edge server 30 (1006) to complete the network configuration settings.

Then, the edge server 30 transmits, through a message including information on the deployed application and coupling information of the terminal, an instruction to adjust the transmission timings to the resource control function 80 (1107). This message includes a telemetry request to the analysis middleware 81. In response to this message, the analysis middleware 81 mounted in the edge server starts a task of analyzing packets flowing through the slice. The resource control function 80 replies with a response message (1108).

During communication, a message including information on the communication is transmitted from the cloud server 40 to the resource control function 80 (1113). The resource control function 80 transmits a message including information on scheduling to the cloud server 40 (1114). The resource control function 80 also transmits a message for reporting the status to the terminal 1 (1115). For example, a telemetry 1503 on a position, a radio wave intensity, and other information of the terminal 1 is reported to the edge server 30. The network slices are formed between the terminal and the cloud server to establish communication 1502. In the communication 1502, the cloud server 40 transmits packets based on a rule on scheduling delivered from the resource control function 80. Further, an analysis of the communication 1502 and an analysis of the telemetry 1503 from the terminal 1 are made in the analysis middleware 81, and the telemetry 1501 as a result of the analyses is provided to the resource control function 80. The resource control function 80 uses information of the telemetry to transmit a message including information on scheduling to the cloud server 40 and update the scheduling as required (1114).

Figure 10:
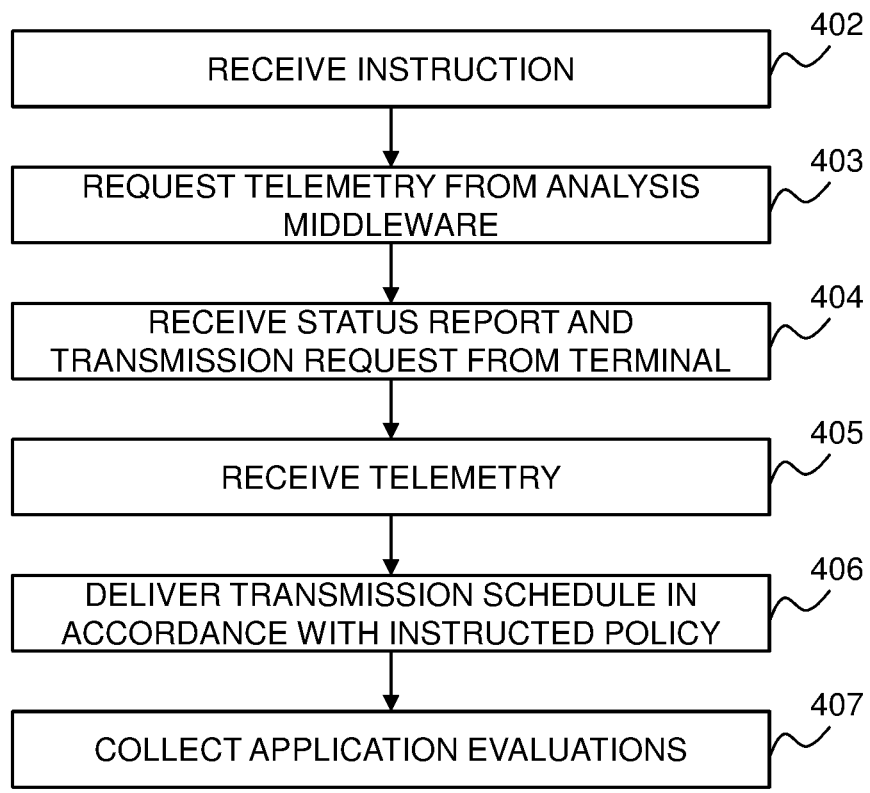
FIG. 10 is a flow chart of processing executed by a resource control function according to the first embodiment.

FIG. 10 is a flow chart of processing executed by the resource control function 80 according to the first embodiment.

First, the resource control function 80 receives, through the message including the information on the deployed application and the coupling information of the terminal from the edge server 30 (1107), the instruction to adjust the transmission timings (Step 402). Then, the resource control function 80 transmits, along with the response to the instruction, a telemetry request (1108) to the analysis middleware 81 (Step 403). The resource control function 80 receives, during the communication, as the information on the communication, a status report of the terminal and information on a transmission request (1109) from the terminal 1 (Step 404). The resource control function 80 receives the telemetry 1501 (Step 405), and delivers a transmission schedule (1110) in accordance with a policy which is set in the instruction received in Step 402 (Step 406). The telemetry 1501 continues, and hence the resource control function 80 collects data of application evaluations to evaluate usage of the network by the application (Step 407).

Next, referring to FIG. 11 to FIG. 15, description is given of use cases to which the first embodiment is applicable.

Figure 11:
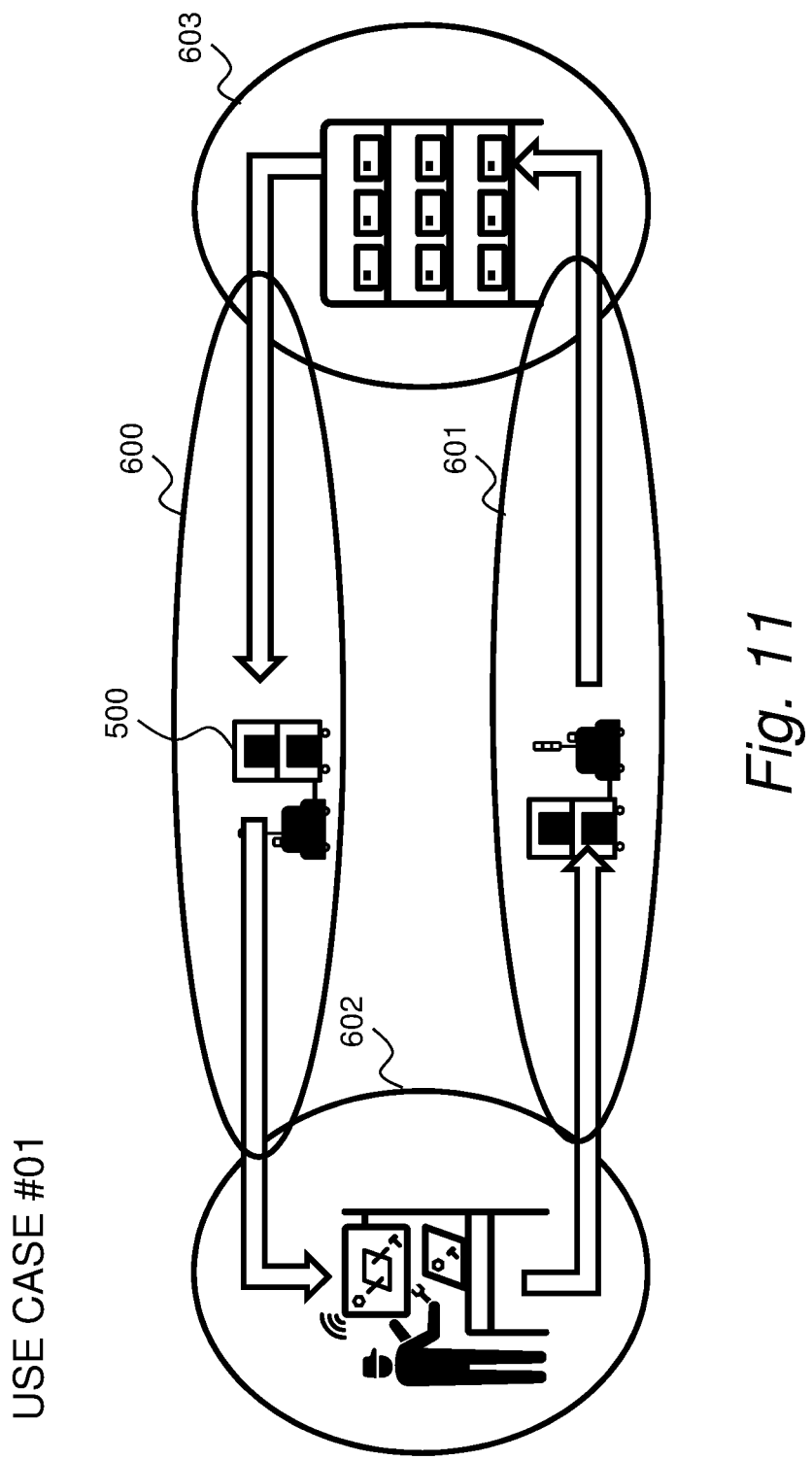
FIG. 11 is a diagram for illustrating a first use case of the first embodiment.

FIG. 11 is a diagram for illustrating the first use case of the first embodiment. In the use case illustrated in FIG. 11, communication of an automated guided vehicle (AGV) 500 used in a factory, a distribution warehouse, or the like is controlled. The AGV 500 is coupled to a management system through use of radio communication, and is managed by the management system. Operation of the AGV 500 is broadly classified into four phases: a first phase 603 of retrieving items from a warehouse, a second phase 600 of conveying the retrieved items, a third phase 602 of passing the retrieved materials to an operator requiring the materials, and a fourth phase 601 of returning to the warehouse. Different processes are performed in the respective phases. Contents of communication and required quality of service change for each phase, and hence priorities should be changed depending on the phase also from the view of the entire network.

In the example of the first embodiment, a policy can be set in accordance with the application deployed in FIG. 7 (1107). In the set policy, management based on the position of the terminal is required. Therefore, a report obtained by including position information in the communication 1500 is sent to the terminal side, and the edge server 30 reports the position information to the resource control function 80 via the telemetry 1501. When the position and the phase are associated with each other, the policy can be changed with a switch of the phase. For example, in the second and fourth phases during the movement, higher priorities are given to perform communication control in real time. In contrast, in the first and third phases, lower priorities may be given to prioritize other communication. Therefore, the problem is solved.

Figure 12:
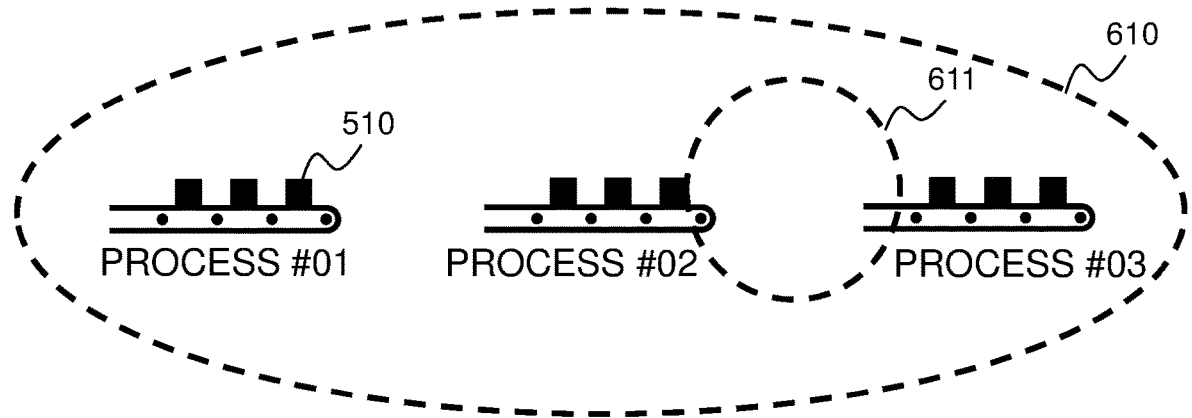
FIG. 12 is a diagram for illustrating a second use case of the first embodiment.

FIG. 12 is a diagram for illustrating the second use case of the first embodiment. In the use case illustrated in FIG. 12, software on a production line in a factory is updated. The software may be installed in semifinished goods 510 moving along the line, and the software may be updated depending on a test required for each step, for example. Even when a wireless communication area 610 is designed to cover the entire line of the factory, the update of the software should be performed in a particular step (that is, location 611) on the line. Otherwise, a mismatch occurs in an environment of test content in a subsequent step, and a process in the subsequent step becomes difficult.

In the example of the first embodiment, a policy can be set in accordance with the application deployed in FIG. 9 (1107). Therefore, as in the first use case, when information on the position is collected from the terminal 1 (1503), and the position and whether the transmission is enabled or disabled are associated with each other in the resource control function 80, a transmission task to be started can be defined to match a particular location, and transmission can be started at the particular location. Therefore, the problem is solved.

Figure 13:
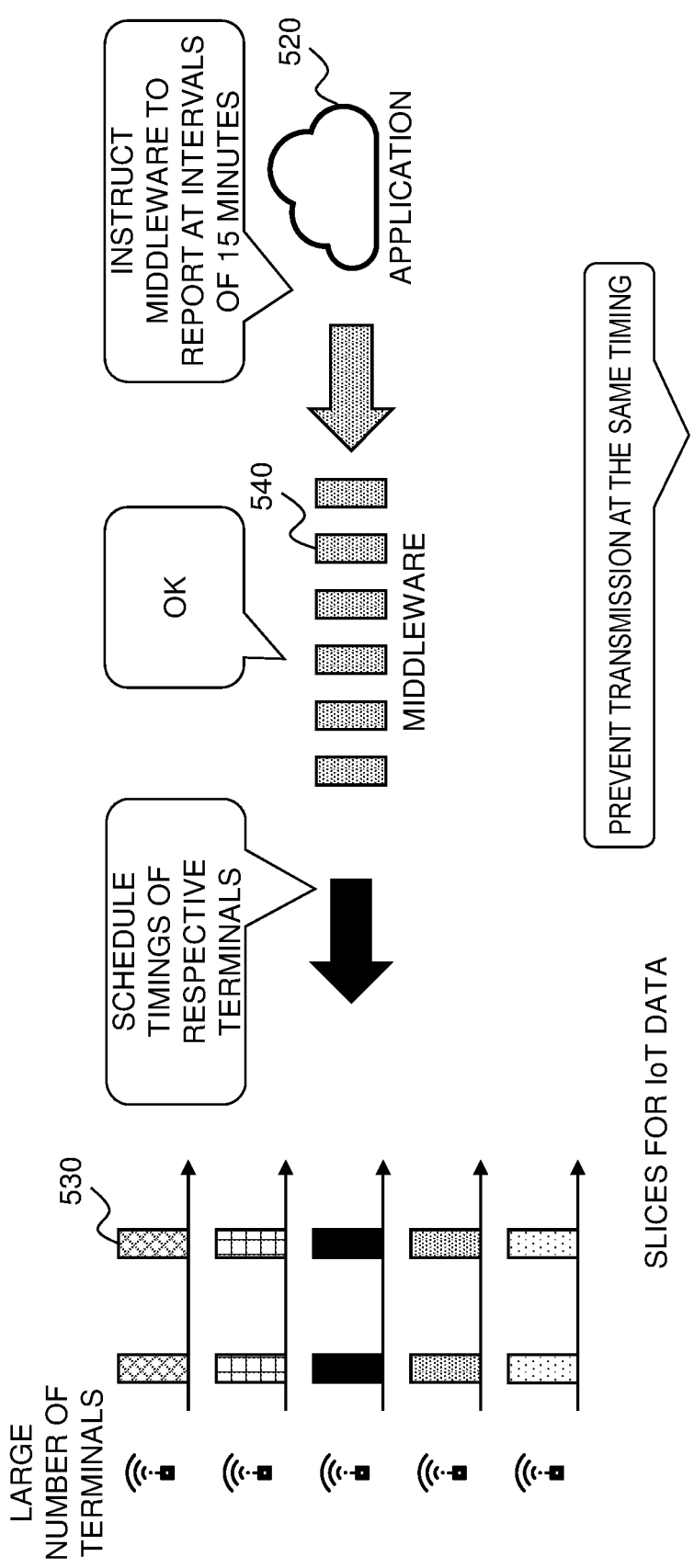
FIG. 13 is a diagram for illustrating a third use case of the first embodiment.

FIG. 13 is a diagram for illustrating the third use case of the first embodiment. In the use case illustrated in FIG. 13, on a production line in a factory, information is collected from sensors arranged in respective steps to collect quality information of semifinished goods moving through manufacturing steps. Inspections are provided in multiple stages in the respective steps. Numeric data is transmitted intermittently from the respective sensors to the center as goods move at fixed intervals on the line (530). However, when the number of sensors becomes enormous, a large amount of inspection data is collected. As a result, burst traffic is generated, and temporary concentration of processing is generated in the network and on the receiver side to become a factor that leads to temporary depletion of network or calculation resources. In order to manage such periodic traffic, it has been considered effective to assign slots in advance in an attempt to suppress occurrence of temporary overlaps (or collisions) of communication.

However, the management of the burst traffic requires a mechanism in which the traffic is analyzed via an analysis function of grasping concentration of traffic, and concentration of traffic is automatically avoided based on a result of the analysis. However, in the related art, predetermined slots are merely provided on the network side, and intermittent operations that are considered to change depending on various factors such as arrangement of sensors or a period of the line cannot be supported, which is insufficient support. In addition, in other related-art technologies, it is described to include means for analyzing the network. However, in such use cases, there is no related-art technology in which transmission timings are arbitrated, and support is considered to be insufficient.

In the example of the first embodiment, a policy can be set in accordance with the application 520 deployed in FIG. 7 (1107). In the set policy, a network status is grasped by the middleware 81 for monitoring and analyzing the network (540), and the timings are adjusted automatically while searching for openings (550). Based on a result of the analysis by the middleware 81, when a new request for periodic coupling (1109) is made, a message including scheduling information including an appropriate offset is transmitted (1110) so that concentration of traffic can be avoided without requiring human intervention. In addition, the resource control function 80 grasps the status with use of the telemetry 1501, and hence can detect partial occurrence of bursts, update the scheduling information for correction as occasion requires, and feedback the transmission timings of the terminal 1 to the transmission control middleware 90, to thereby automatically correct particular imbalance in traffic. Therefore, the problem is solved.

Figure 14:
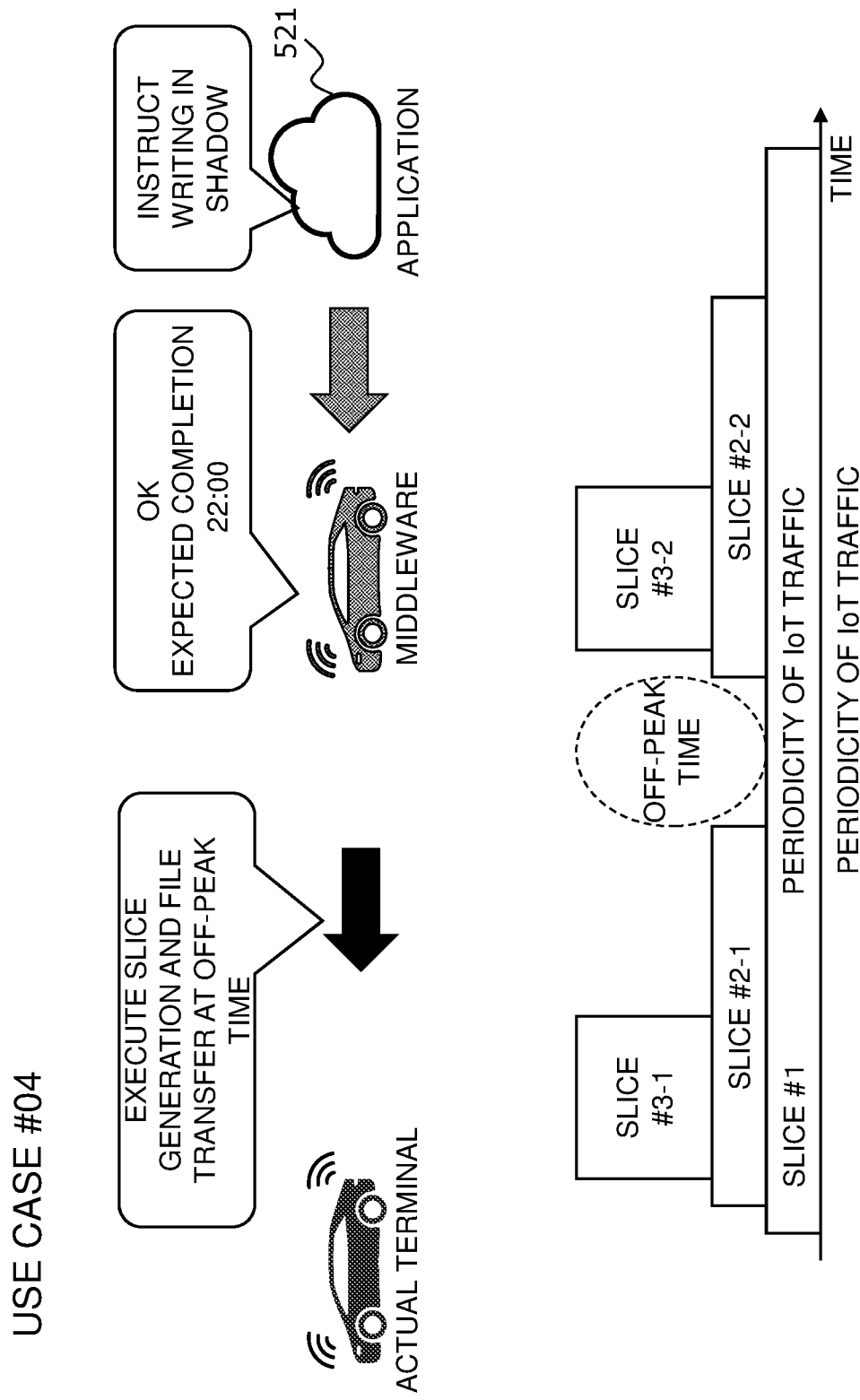
FIG. 14 is a diagram for illustrating a fourth use case of the first embodiment.

FIG. 14 is a diagram for illustrating the fourth use case of the first embodiment. In the use case illustrated in FIG. 14, traffic congestion is grasped, and a large amount of data is transmitted at an off-peak time. In the fourth use case, an application completes transmission processing by a writing request to a middleware for arbitrating the transmission. The middleware grasps the network status to estimate the off-peak time of the traffic, and transmits the data at the off-peak time.

In the example of the first embodiment, a policy can be set in accordance with the application 521 deployed in FIG. 7 (1107). In the set policy, a network status is grasped by the middleware 81 for monitoring and analyzing the network, and an aggregate of temporal openings is predicted. Specifically, the off-peak time is predicted by a known method, for example, the SARIMA method, and the timings to transmit the data is automatically adjusted based on a result of predicting the off-peak time. Then, when an appropriate timing arrives, a message including the scheduling information is transmitted (1110). As a result, the off-peak time can be estimated without requiring human intervention. Therefore, the problem is solved.

Figure 15:
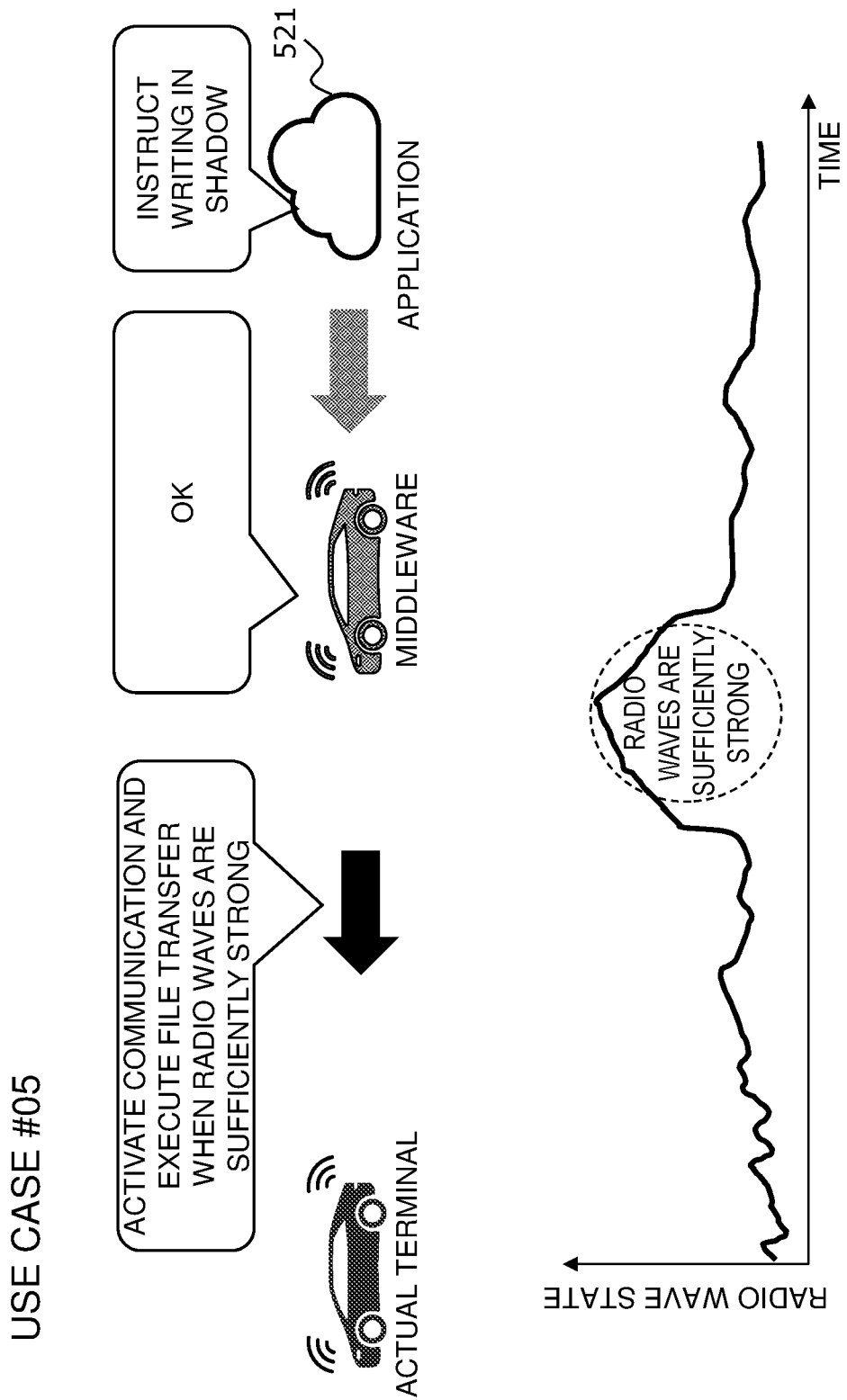
FIG. 15 is a diagram for illustrating a fifth use case of the first embodiment.

FIG. 15 is a diagram for illustrating the fifth use case of the first embodiment. The use case illustrated in FIG. 15 is a case in which a radio wave status of the terminal 1 is grasped to transmit a large amount of data targeting a time when the radio wave status is good. In the fifth use case, an application completes transmission processing by a writing request to a middleware for arbitrating the transmission. The middleware grasps the radio wave status of the terminal to estimate a radio wave state of the terminal, and transmits the data at appropriate timings.

As described above in the second use case, in the sequence of FIG. 9, based on the telemetry instruction for a radio wave state to the terminal 1 (1115), the telemetry 1503 for periodically reporting the status of the radio wave from the terminal 1 is instructed. The resource control function 80 can recognize appropriate timings based on the information. In a case in which a state in which the radio wave state is higher than a threshold value continues, the file can be updated easily from the cloud server 40. Therefore, the problem is solved.

As described above, according to the first embodiment, temporary surplus of resources that cannot be used up in the slices can be managed and arbitrated among the slices. Further, overcommitment of SLAs of the slices is permitted so that, even when unused surplus is generated in the limited computer resource of the edge server 30, and in the limited network resources coupling the terminal 1 and the edge server 30, the NW slices can be provided efficiently.

Second Embodiment

A second embodiment of this invention is described. The second embodiment is different from the first embodiment in that a message exchanged with the repository 60 by the resource control function 80 is added. According to the second embodiment, the difference from the first embodiment is mainly described, and description of components and functions that are the same as those in the first embodiment is omitted.

Figure 16:
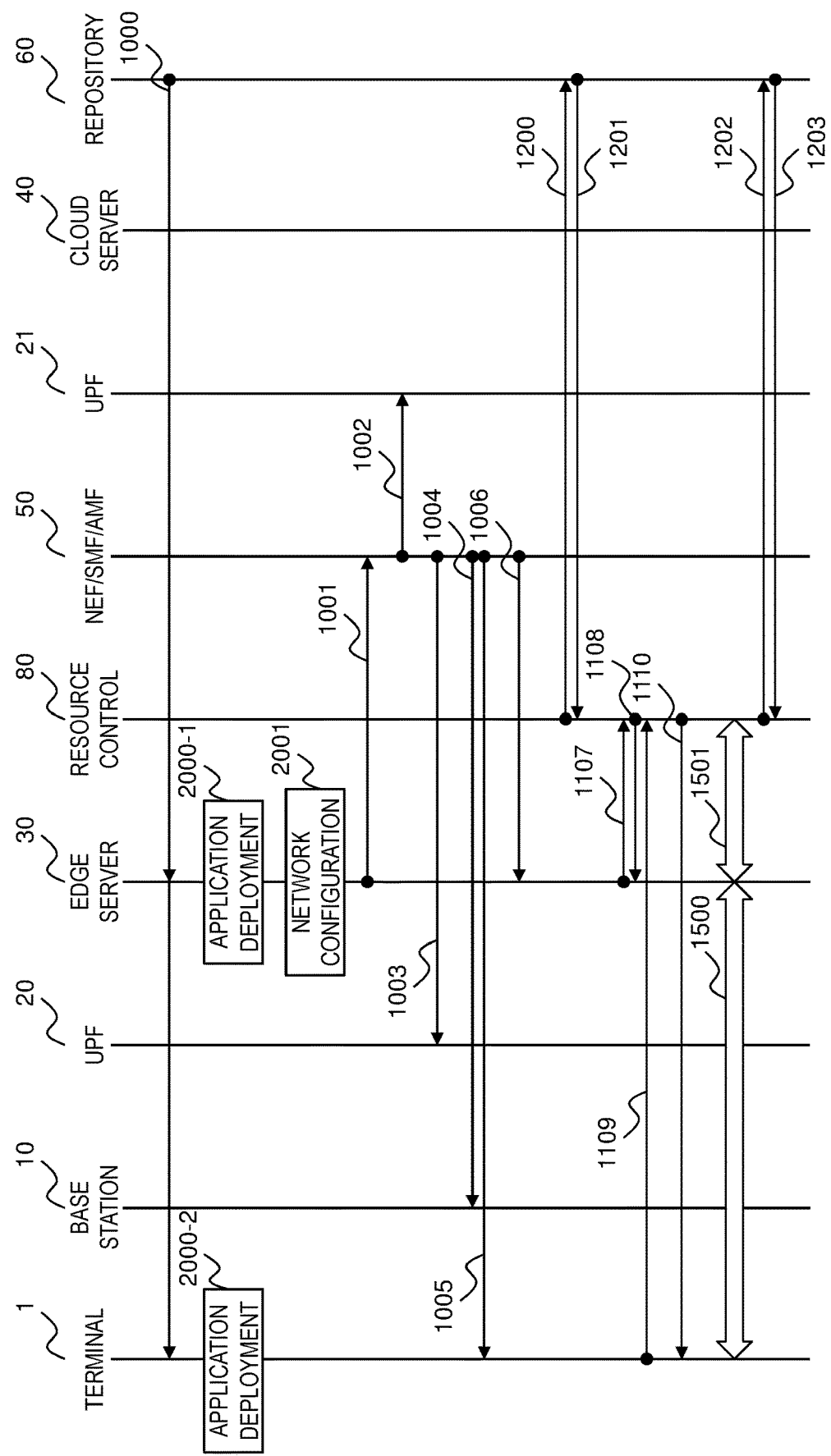
FIG. 16 is a sequence chart for illustrating signaling in which a network configuration is set after application is deployed according to a second embodiment.

FIG. 16 is a signaling sequence chart in which the application is deployed from the repository 60 to the terminal 1 and the edge server 30, and then a network configuration is set according to the second embodiment of this invention.

In downloading of messages and software for deployment (1000), messages and a software main body for instructing each node on the deployment are transported from the repository 60. For example, the terminal 1 deploys a terminal application (2000-2), and the edge server 30 deploys an edge server application (2000-1). Then, the edge server 30 carries out a network configuration process (2001), analyzes network requirements required by the application, and transmits a request message to the 5G core apparatus 50 (1001). A result thereof is transmitted as setting messages to the UPFs 20 and 21 via the SMF (1002 and 1003). Setting messages are also transmitted to the base station apparatus 10 and the terminal 1 via the AMF (1004 and 1005). Thereafter, a response message is returned from the 5G core apparatus 50 to the edge server 30 (1006) to complete the network configuration settings.

Then, the resource control function 80 receives, through a message including information on the deployed application and coupling information of the terminal, an instruction to adjust the transmission timings from the edge server 30 (1107). In advance thereto, through steady state communication to/from the repository 60, information on a policy for each application is received from the repository 60 (1200 and 1201). For example, the resource control function 80 requests table update information from the repository 60, and the repository 60 replies with the update information to the resource control function 80. Further, the resource control function 80 receives a result of analysis from the analysis middleware 81 (1501), reports the result to the repository 60 (1202), and receives a response (1203). Through the series of procedures, the resource control function 80 can change the policy based on a trend among a plurality of locations at which the same application is used.

Figure 17:
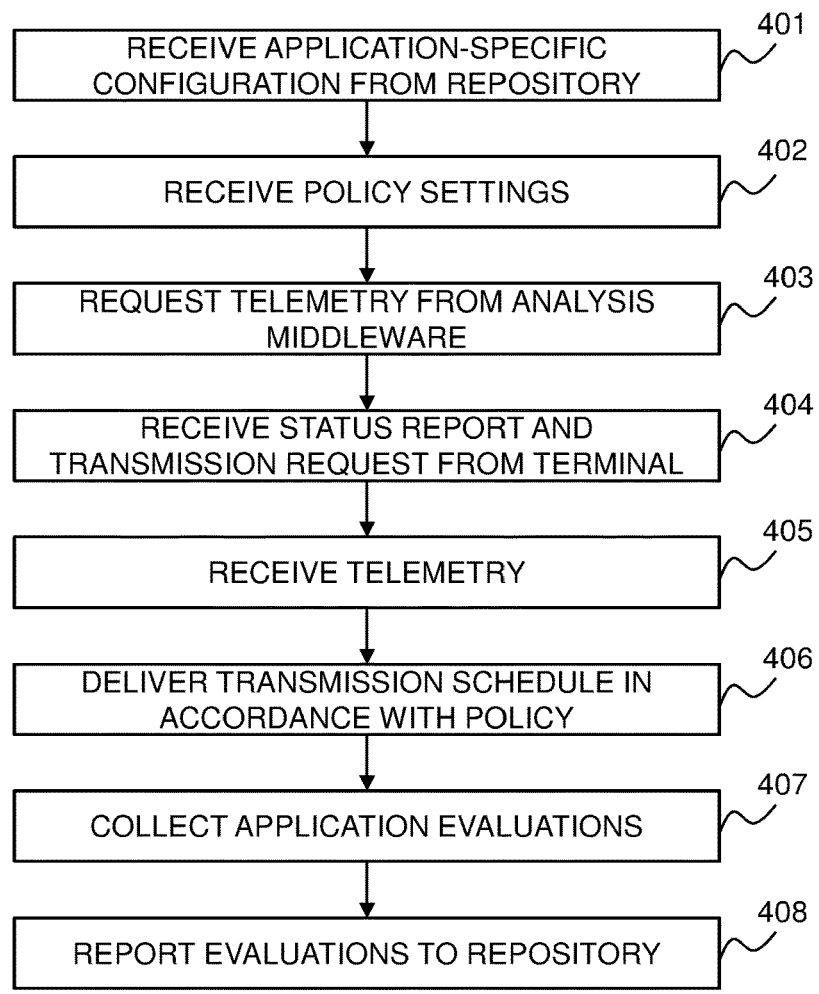
FIG. 17 is a flow chart of processing executed by a resource control function according to the second embodiment.

FIG. 17 is a flow chart of processing executed by the resource control function 80 according to the second embodiment.

First, the resource control function 80 communicates to/from the repository 60 at regular intervals to receive an application-specific configuration accumulated in a database (Step 401). Next, the resource control function 80 receives, through the message including the information on the deployed application and the coupling information of the terminal from the edge server 30 (1107), the instruction to adjust the transmission timings (Step 402). Then, the resource control function 80 transmits, along with the response to the instruction, a telemetry request (1108) to the analysis middleware 81 (Step 403). The resource control function 80 receives, during the communication, as the information on the communication, a status report of the terminal and information on a transmission request (1109) from the terminal 1 (Step 404). The resource control function 80 receives the telemetry 1501 (Step 405), and delivers a transmission schedule (1110) in accordance with a policy which is set in the instruction received in Step 402 (Step 406). The telemetry 1501 continues, and hence the resource control function 80 collects data of application evaluations to evaluate usage of the network by the application (Step 407). The resource control function 80 feeds back an evaluation result to the repository 60 to/from which the resource control function 80 communicates at regular intervals (Step 408).

Figure 18:
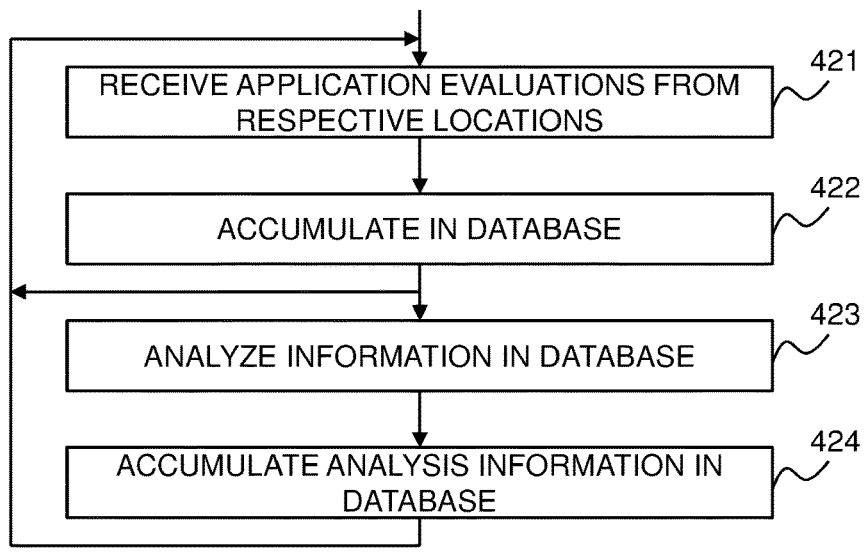
FIG. 18 is a flow chart of database update processing executed by a repository according to the second embodiment.

FIG. 18 is a flow chart of database update processing executed by the repository 60 according to the second embodiment.

The repository 60 receives evaluation results from the resource control functions 80 individually arranged at a plurality of locations (Step 421), and accumulates the results in the database (Step 422). After a predetermined period, the repository 60 analyzes the database. For example, parameters in rating of priorities and scheduling can be adjusted, and support for a change in association of the application can be reviewed. Specifically, not in support for individual environments, but in support for a change in a case in which a data transmission amount is increased by update of the application, for example, results of analyzing the database can be reflected on the entire associated locations. Therefore, the problem is solved.

Figure 19:
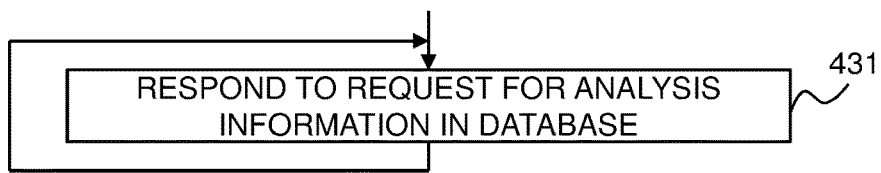
FIG. 19 is a flow chart of processing of responding to a request for database information, which is executed by the repository according to the second embodiment.

FIG. 19 is a flow chart of processing of responding to a request for database information, which is executed by the repository 60 according to the second embodiment.

As illustrated in FIG. 19, the repository 60 repeats procedures of reading information on an associated application from the database in response to a data analysis request from each location, and responding to the resource control function 80 of the requested location.

Third Embodiment

In a third embodiment of this invention, a policy is set in advance to automatically assign priorities to communication based on a rule.

Figure 20:
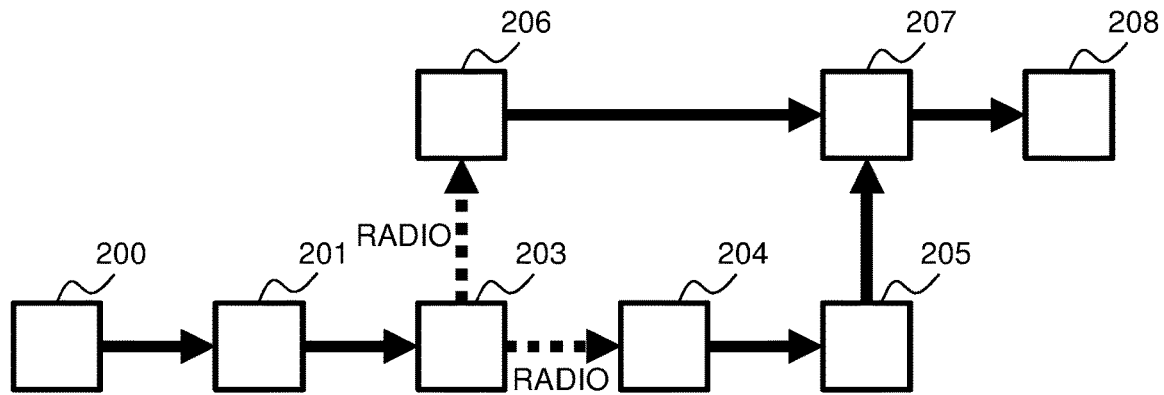
FIG. 20 is a diagram for illustrating a relationship of modules in a case in which one service is formed of a plurality of divided modules.

FIG. 20 is a diagram for illustrating a relationship of modules in a case in which one service is formed of a plurality of divided modules 200 to 208.

Communication from the module 203 to the module 206 and the module 204 next thereto is radio communication. Radio communication resources are limited, and a channel band is narrower than other communication paths. When the communication from the module 203 to the module 206 and the communication from the module 203 to the module 204 are compared, the number of modules is larger in the path passing through the module 204. When it is assumed that the module 207 cannot transport a result of processing to the last module 208 unless data arrives from both the path from the module 206 and the path from the module 204, the path from the module 203 to the module 204 should be given higher priority to convey data and suppress delays as a whole. Also in terms of such determination, the network analysis middleware 81 can grasp the topology of the modules to determine priorities based on the topology. Therefore, the problem is solved.

Figure 21:
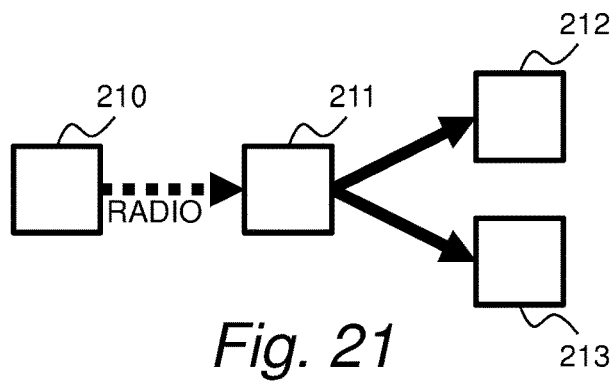
FIG. 21 and FIG. 22 are schematic diagrams of cases in which there are two services and priorities are assigned thereto.
Figure 22:
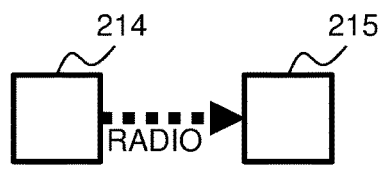

FIG. 21 and FIG. 22 are schematic diagrams of cases in which there are two services and priorities are assigned thereto. In the case illustrated in FIG. 21, communication from a module 210 to a module 211 is radio communication. It should be noted, however, that results of processing in the module 211 are transported to a plurality of modules 212 and 213. In the case illustrated in FIG. 22, communication from a module 214 to a module 215 is radio communication. When those two cases are compared, it can be understood that the configuration of FIG. 21 is an application having a greater influence because data transported via radio is used for a plurality of applications. Also in terms of such determination, the network analysis middleware 81 can grasp the topology of the modules to determine priorities based on the topology. Therefore, the problem is solved.

As described above, even in a case of forming complex microservices, the priorities can be determined by providing a simple rule.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:
1. A communication system, comprising:
at least one IoT terminal;
a base station apparatus to which the at least one IoT terminal is to be coupled;
an edge server configured to selectively receive user plane packets transmitted and received by the base station apparatus; and
a cloud server configured to selectively receive user plane packets transmitted and received by one of the base station apparatus and the edge server,
wherein at least one of the at least one IoT terminal, the edge server, or the cloud server has arranged therein a first middleware formed of software, and
wherein the first middleware is configured to:
receive an instruction on a policy which is set based on a result of analyzing traffic of packets transported in the communication system;
receive by proxy an instruction to transmit packets from an application;
adjust timings to transmit the packets in accordance with the instructed policy; and
relay a transmission instruction to a communication module, wherein the communication module controls a timing of uplink packets based on the transmission instruction,
wherein the edge server has arranged therein a second middleware formed of software,
wherein the second middleware is configured to:
generate a control policy on the timings to transmit the packets in accordance with the policy which is set by a user, based on the result of analyzing the packets transported in the communication system; and
instruct the first middleware on the generated control policy, wherein the edge server has arranged therein a third middleware formed of software, and wherein the third middleware is configured to:

capture packets transported from at least one of the at least one IoT terminal, the edge server, or the cloud server;

analyze the traffic based on the captured packets; and provide the result of analysis to the second middleware.

2. The communication system according to claim 1, further comprising:

a first separation apparatus, which is coupled to the base station apparatus, and is configured to selectively separate and transport the packets to the edge server; and a second separation apparatus, which is coupled to the first separation apparatus, and is configured to selectively separate and transport the packets to the cloud server.

3. The communication system according to claim 1, wherein the first middleware arranged in the at least one IoT terminal is configured to:

detect one of a radio wave intensity and position information of the base station apparatus received by the at least one IoT terminal; and report the detected one of radio wave intensity and position information to the second middleware, and wherein the second middleware is configured to generate the control policy based on the reported one of radio wave intensity and position information.

4. The communication system according to claim 1, further comprising a repository configured to store a module forming an application, and to deploy the module in one of the at least one IoT terminal, the edge server, and the cloud server, wherein the second middleware is configured to generate the control policy in accordance with individual settings associated with the application formed of the module deployed from the repository.

5. The communication system according to claim 1, wherein the second middleware is configured to generate the control policy based on one of a predicted value of the result of analysis by the third middleware, position information of the at least one IoT terminal, and a radio wave intensity of the at least one IoT terminal.

6. A communication control method, which is executed in a communication system, the communication system having: at least one IoT terminal; a base station apparatus to which the at least one IoT terminal is to be coupled; an edge server configured to selectively receive user plane packets transmitted and received by the base station apparatus; and a cloud server configured to selectively receive user plane packets transmitted and received by one of the base station apparatus and the edge server, at least one of the at least one IoT terminal, the edge server, or the cloud server having arranged therein a first middleware formed of software, the communication control method comprising the steps of:

receiving, by the first middleware, an instruction on a policy which is set based on a result of analyzing traffic of packets transported in the communication system;

receiving by proxy, by the first middleware, an instruction to transmit packets from an application;

adjusting, by the first middleware, timings to transmit the packets in accordance with the instructed policy; and relaying, by the first middleware, a transmission instruction to a communication module, wherein the communication module controls a timing of uplink packets based on the transmission instruction, wherein the edge server has arranged therein a second middleware formed of software, wherein the communication control method further comprises:

generating, by the second middleware, a control policy on the timings to transmit the packets in accordance with the policy which is set by a user, based on the result of analyzing the packets transported in the communication system; and instructing, by the second middleware, the first middleware on the generated control policy, wherein the edge server has arranged therein a third middleware formed of software, and wherein the communication control method further comprises:

capturing, by the third middleware, packets transported from at least one of the at least one IoT terminal, the edge server, or the cloud server;

analyzing, by the third middleware, the traffic based on the captured packets; and providing, by the third middleware, the result of analysis to the second middleware.

7. A non-transitory machine-readable storage medium, containing at least one sequence of instructions for controlling communication in a communication system, the communication system including: at least one IoT terminal; a base station apparatus to which the at least one IoT terminal is to be coupled; an edge server configured to selectively receive user plane packets transmitted and received by the base station apparatus; and a cloud server configured to selectively receive user plane packets transmitted and received by one of the base station apparatus and the edge server, the instructions that, when executed, causes the edge server to:

receive an instruction on a policy which is set based on a result of analyzing traffic of packets transported in the communication system;

receive by proxy an instruction to transmit packets from an application;

adjust timings to transmit the packets in accordance with the instructed policy;

relay a transmission instruction to a communication module, wherein the communication module controls a timing of uplink packets based on the transmission instruction;

generate a control policy on the timings to transmit the packets in accordance with the policy which is set by a user, based on the result of analyzing the packets transported in the communication system;

instruct any one of the at least one IoT terminal, the edge server, and the cloud server on the generated control policy;

capture packets transported from at least one of the at least one IoT terminal, the edge server, or the cloud server; and analyze the traffic based on the captured packets.

* * * * *